US012032206B2

United States Patent
Ooki et al.

(10) Patent No.: US 12,032,206 B2
(45) Date of Patent: Jul. 9, 2024

(54) FUSION SPLICING DEVICE

(71) Applicant: SUMITOMO ELECTRIC OPTIFRONTIER CO., LTD., Yokohama (JP)

(72) Inventors: Kazuyoshi Ooki, Yokohama (JP); Takahiro Suzuki, Yokohama (JP)

(73) Assignee: SUMITOMO ELECTRIC OPTIFRONTIER CO., LTD., Tokohama (JP)

(*) Notice: Subject to any disclaimer, the term of this patent is extended or adjusted under 35 U.S.C. 154(b) by 472 days.

(21) Appl. No.: 17/296,206

(22) PCT Filed: Dec. 12, 2019

(86) PCT No.: PCT/JP2019/048803
§ 371 (c)(1),
(2) Date: May 21, 2021

(87) PCT Pub. No.: WO2020/122206
PCT Pub. Date: Jun. 18, 2020

(65) Prior Publication Data
US 2022/0011515 A1   Jan. 13, 2022

(30) Foreign Application Priority Data
Dec. 13, 2018 (JP) .................. 2018-233550

(51) Int. Cl.
*G02B 6/255* (2006.01)

(52) U.S. Cl.
CPC ......... *G02B 6/2553* (2013.01); *G02B 6/2551* (2013.01)

(58) Field of Classification Search
CPC ........................... G02B 6/255–2558
See application file for complete search history.

(56) References Cited

U.S. PATENT DOCUMENTS

| 7,412,146 B2 | 8/2008 | Sato et al. | |
| 2004/0218891 A1* | 11/2004 | Clark | G06Q 99/00 385/147 |

(Continued)

FOREIGN PATENT DOCUMENTS

| CN | 105356412 A | 2/2016 |
| CN | 108594365 A | 9/2018 |

(Continued)

OTHER PUBLICATIONS

Jun. 8, 2021 International Preliminary Report on Patentability issued in International Patent Application No. PCT/JP2019/048803.

*Primary Examiner* — Erin Snelting
(74) *Attorney, Agent, or Firm* — Oliff PLC

(57) ABSTRACT

A fusion splicing apparatus includes a fusion splicing unit, a clock unit that outputs a current date and time, and a fusion control unit that controls an operation of the fusion splicing unit and stops the operation of the fusion splicing unit when a remaining period of use known on the basis of the current date and time output from the clock unit and a usable period input from the outside in advance is zero or less. The fusion control unit records information on the number of times of electric discharge per unit period when the clock unit is normal and determines the remaining period of use assuming that the unit period has elapsed when the number of times of electric discharge has reached the number of times of electric discharge per unit period in a case in which an abnormality of the clock unit is detected.

6 Claims, 6 Drawing Sheets

(56) References Cited

U.S. PATENT DOCUMENTS

| | | | |
|---|---|---|---|
| 2005/0238298 A1 | 10/2005 | Roark et al. | |
| 2006/0263016 A1* | 11/2006 | Wiley ................. | G02B 6/2551 |
| | | | 385/96 |
| 2013/0284377 A1 | 10/2013 | Takayanagi et al. | |

FOREIGN PATENT DOCUMENTS

| | | |
|---|---|---|
| JP | H11-58526 A | 3/1999 |
| JP | 2012-141357 A | 7/2012 |
| JP | 2017-224076 A | 12/2017 |
| WO | 2014/118869 A1 | 8/2014 |

\* cited by examiner

FUSION SPLICING DEVICE

TECHNICAL FIELD

The present disclosure relates to a fusion splicing apparatus. The present application claims priority based on Japanese Patent Application No. 2018-233550, filed on Dec. 13, 2018, the entire contents of which are incorporated herein by reference.

BACKGROUND ART

Patent Literature 1 discloses a fusion splicing apparatus to fusion splice optical fibers by electric discharges.

CITATION LIST

Patent Literature

[Patent Literature 1] Japanese Unexamined Patent Publication No. 2012-141357

SUMMARY OF INVENTION

The present disclosure provides a fusion splicing apparatus. The fusion splicing apparatus includes a fusion splicing unit configured to fusion splice optical fibers by electric discharges, a clock unit configured to output a current date and time, and a fusion control unit configured to control an operation of the fusion splicing unit and stop the operation of the fusion splicing unit when a remaining period of use known on the basis of the current date and time output from the clock unit and a usable period input from the outside in advance is zero or less. The fusion control unit records information on the number of times of electric discharge per unit period when the clock unit is normal and determines the remaining period of use assuming that the unit period has elapsed when the number of times of electric discharge has reached the number of times of electric discharge per unit period in a case in which an abnormality of the clock unit is detected.

DESCRIPTION OF EMBODIMENTS

Figure 1:
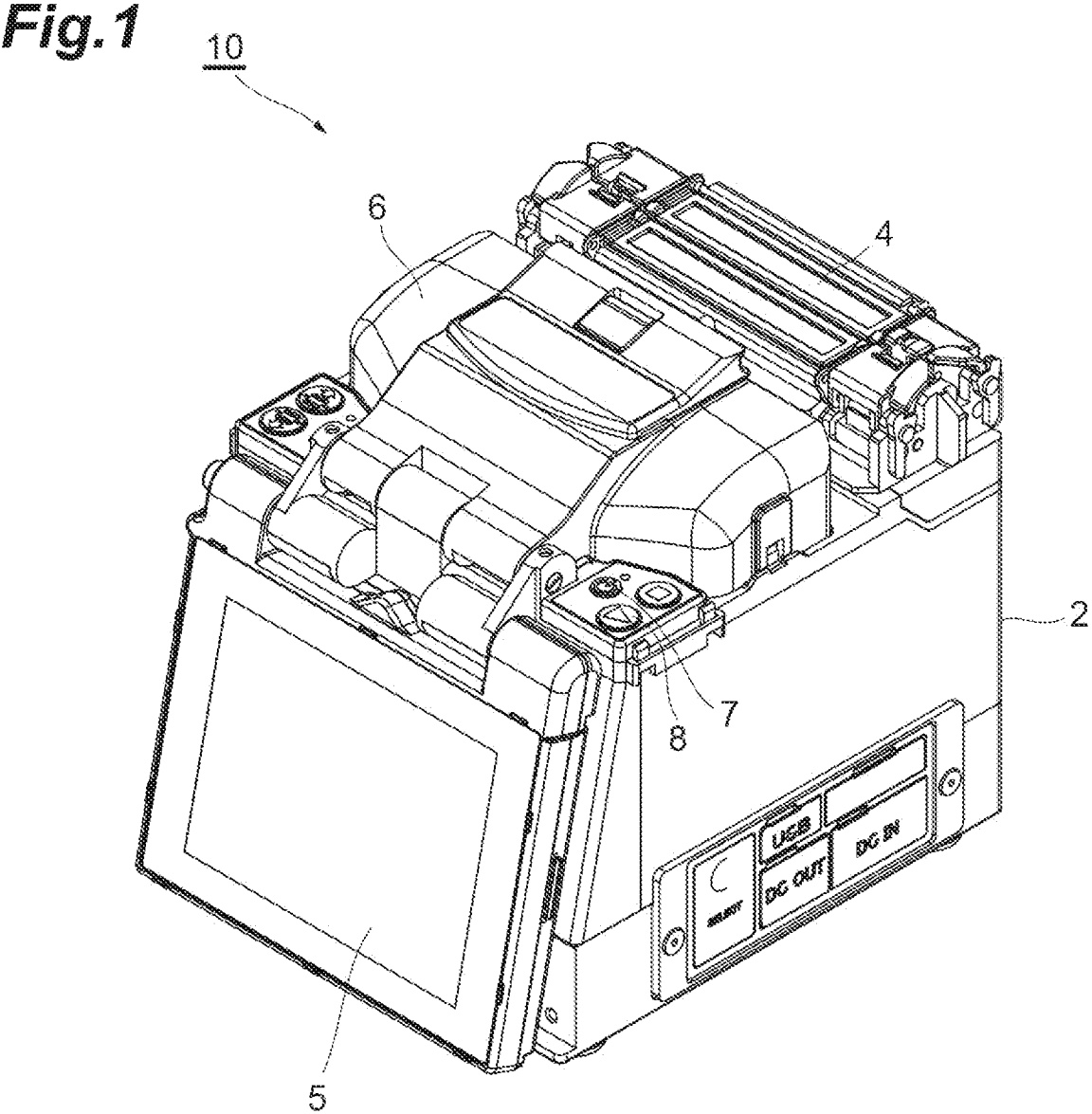
FIG. 1 is a perspective view illustrating an external appearance of a fusion splicing apparatus according to one embodiment and illustrates an external appearance in a state in which a windproof cover is closed.

Problems to be Solved by the Disclosure

A fusion splicing apparatus to fusion splice optical fibers is compactly configured so that it is easily carried for ease of use at construction sites or the like. Such a fusion splicing apparatus is generally expensive because a structure thereof is complicated and requires a high degree of precision. There is a problem that the fusion splicing apparatus may be stolen at a construction site or carried away without being returned as it is after being lent. Thus, it is desired that the fusion splicing apparatus have a function of setting a usable period at the start of use (or at the start of lending) and disabling (locking) the fusion splicing when the usable period has elapsed. In that case, the fusion splicing apparatus needs to include a real-time clock (RTC) that keeps counting a date and time regardless of power on/off of the fusion splicing apparatus to accurately determine whether or not the usable period has elapsed.

If an abnormality occurs in the RTC and an accurate date and time cannot be output, determining whether or not the usable period has elapsed is impossible, and it becomes difficult to lock the fusion splicing function. It is also conceivable to take advantage of this and intentionally break the RTC of the fusion splicing apparatus that has been stolen or the like to make it impossible to lock the fusion splicing function. Further, it is also conceivable to lock the fusion splicing function when an abnormality of the RTC is detected, but if it is merely due to a failure of the RTC, there is a likelihood that fusion splicing work cannot be performed within a construction period and a user suffers great damage.

Advantageous Effects of Invention

According to the present disclosure, the fusion splicing function can be locked after a period close to the usable period even when an abnormality occurs in the RTC.

Explanation of Embodiments of the Disclosure

First, contents of the embodiments of the present invention will be listed and described. A fusion splicing apparatus according to one embodiment includes a fusion splicing unit configured to fusion splice optical fibers by electric discharges, a clock unit configured to output a current date and time, and a fusion control unit configured to control an operation of the fusion splicing unit and stop the operation of the fusion splicing unit when a remaining period of use known on the basis of the current date and time output from the clock unit and a usable period input from the outside in advance is zero or less. The fusion control unit records information on the number of times of electric discharge per unit period when the clock unit is normal and determines the remaining period of use assuming that the unit period has elapsed when the number of times of electric discharge has reached the number of times of electric discharge per unit period in a case in which an abnormality of the clock unit is detected.

In the fusion splicing apparatus, when the remaining period of use known from the current date and time and the usable period is zero or less, the fusion control unit stops the operation of the fusion splicing unit. Thereby, it is possible to realize a function of setting a usable period, for example, at the start of use (or at the start of lending) and disabling (locking) the fusion splicing when the usable period has elapsed. Further, the fusion control unit records information on the number of times of electric discharge per unit period when the clock unit is normal. When an abnormality of the clock unit is detected, the fusion control unit determines the remaining period of use assuming that the unit period has elapsed when the number of times of electric discharge has reached the number of times of electric discharge per unit period. Thereby, the fusion splicing function can be locked after a period close to the usable period even when an abnormality occurs in the clock unit.

In the above-described fusion splicing apparatus, the unit period may be N days (N is an integer of 1 or more). When construction work including the fusion splicing of optical fibers is performed, the work is often carried out in a daily cycle, such as working during daytime and resting at night (or vice versa). Thus, when the above-described unit period is set in units of days such as N days, the number of times of electric discharge per unit period is stable and the remaining period of use can be determined more accurately.

In the above-described fusion splicing apparatus, the fusion control unit may determine the clock unit as abnormal when a signal on a date and time is not output from the clock unit. Thereby, an abnormality of the clock unit can be appropriately determined.

In the above-described fusion splicing apparatus, the fusion control unit may determine the clock unit as abnormal when a current date and time output from the clock unit is earlier than a date and time stored in advance. Thereby, an abnormality of the clock unit can be appropriately determined.

In the above fusion splicing apparatus, the fusion control unit may determine the remaining period of use assuming that the unit period has elapsed when the number of times of electric discharge has reached a moving average value of the number of times of electric discharge per unit period that has been recorded when the clock unit is normal in a case in which an abnormality of the clock unit is detected. Thereby, even when the number of times of electric discharge per unit period changes for each unit period, the remaining period of use can be determined more accurately.

Detailed Description of Embodiments of the Present Disclosure

Specific examples of a fusion splicing apparatus according to the embodiments of the present disclosure will be described below with reference to the drawings. The present invention is not limited to these examples but is defined by the scope of the claims, and is intended to include meanings equivalent to the claims and all modifications within the scope. In the following description, the same elements will be denoted by the same reference signs in the description of the drawings, and duplicate description thereof will be omitted.

Figure 2:
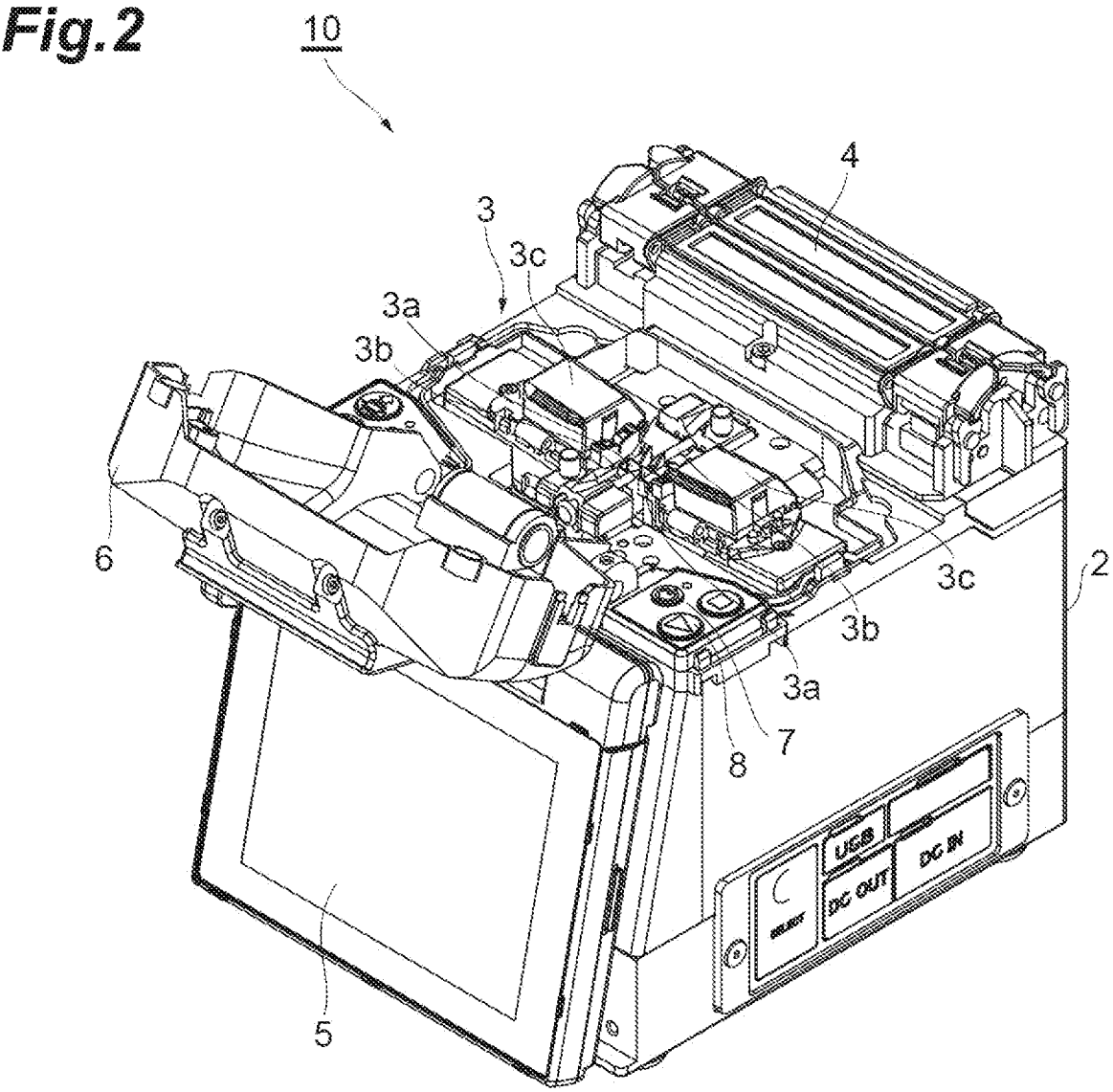
FIG. 2 is a perspective view illustrating an external appearance of the fusion splicing apparatus according to one embodiment and illustrates an external appearance in a state in which the windproof cover is opened and an internal structure of the fusion splicing apparatus can be seen.

FIGS. 1 and 2 are perspective views illustrating an external appearance of a fusion splicing apparatus 10 according to the present embodiment. FIG. 1 illustrates an external appearance in a state in which a windproof cover is closed, and FIG. 2 illustrates an external appearance in a state in which the windproof cover is opened and an internal structure of the fusion splicing apparatus 10 can be seen. The fusion splicing apparatus 10 is an apparatus for fusion splicing optical fibers to each other by electric discharges and includes a box-shaped housing 2 as illustrated in FIGS. 1 and 2. A fusion splicing unit 3 for fusing the optical fibers to each other and a heater 4 are provided on an upper portion of the housing 2. The heater 4 heats and contracts a fiber reinforcing sleeve covering a fused portion of the optical fibers. The fusion splicing apparatus 10 further includes a monitor 5, a windproof cover 6, a power switch 7, and a splicing start switch 8. The monitor 5 displays a fusion connection state of the optical fibers captured by a camera (not illustrated) disposed inside the housing 2. The windproof cover 6 prevents wind from entering the fusion splicing unit 3. The power switch 7 is a push button for switching power of the fusion splicing apparatus 10 on/off according to an operation of a user. The splicing start switch 8 is a push button for starting an operation for fusing the optical fibers to each other according to an operation of the user.

As illustrated in FIG. 2, the fusion splicing unit 3 includes a pair of fiber positioning parts 3a, a pair of discharging electrodes 3b, and a holder placing part on which a pair of optical fiber holders 3c can be placed. Optical fibers to be fused are held and fixed in the optical fiber holders 3c, and the optical fiber holders are placed on and fixed to the holder placing part. The fiber positioning parts 3a are disposed between the optical fiber holders 3c and position distal end portions of the optical fibers held in the optical fiber holders 3c. The discharging electrodes 3b are disposed between the fiber positioning parts 3a and fuse the distal ends of the optical fibers together by an arc discharge. In the fusion splicing apparatus 10, conditions of various types such as fiber positioning processing by the fiber positioning parts 3a and the arc discharging by the discharging electrodes 3b are controlled by operation software stored in a memory or the like of the fusion splicing apparatus 10.

Figure 3:
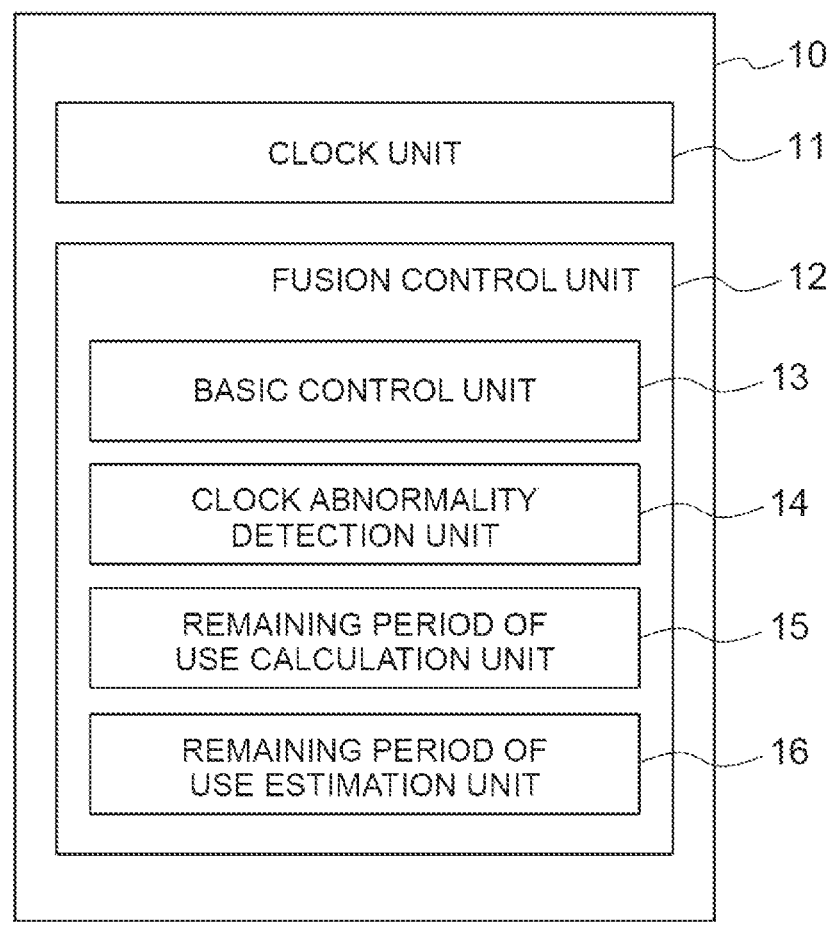
FIG. 3 is a functional block diagram illustrating a configuration of an internal system provided in the fusion splicing apparatus.

FIG. 3 is a functional block diagram illustrating a configuration of an internal system provided in the fusion splicing apparatus 10. As illustrated in FIG. 3, the fusion splicing apparatus 10 includes a clock unit 11 and a fusion control unit 12 in addition to the fusion splicing unit 3 described above. The clock unit 11 is a real-time clock (also called RTC or a hardware clock) that outputs a current date and time and receives a backup of power from a battery to constantly keep counting the current date and time regardless of a power supply state (on/off) of the fusion splicing apparatus 10. The clock unit 11 may be configured by, for example, an IC and provided as an independent semiconductor chip mounted on a circuit board. Typically, the clock unit 11 outputs information of "year," "month," "day," "hour," "minute," and "second" as an electric signal.

The fusion control unit 12 is configured to include a basic control unit 13, a clock abnormality detection unit 14, a remaining period of use calculation unit 15, and a remaining period of use estimation unit 16. The basic control unit 13 controls an operation of the fusion splicing unit 3. That is, the basic control unit 13 receives an operation of the splicing start switch 8 by the user and controls a contact operation and an arc discharge between the distal ends of the optical fibers in the fusion splicing unit 3. The control of arc discharge includes control of discharge voltage and control of discharge timing. The clock abnormality detection unit 14 receives an input of a signal from the clock unit 11 and detects an abnormality of the clock unit 11. From the normal clock unit 11, a signal on the current date and time is constantly output during operation. When a signal on the date and time is not output from the clock unit 11, the clock abnormality detection unit 14 determines the clock unit 11 as abnormal. Alternatively, even when a signal on the date and time is output from the clock unit 11, the date and time may be obviously incorrect. When the date and time output from the clock unit 11 is earlier than a date and time stored in advance (for example, a date and time set at the time of product shipment or a date and time when power was last turned off), the clock abnormality detection unit 14 may also determine the clock unit 11 as abnormal. The abnormality determination methods of the clock unit 11 described above are examples, and various other methods that enable an abnormality of the clock unit 11 to be detected can be applied.

The remaining period of use calculation unit 15 calculates a remaining period of use on the basis of the current date and time output from the clock unit 11 and a usable period input from the outside in advance. The "usable period" is a period preset by the user, a lender, or the like, and the basic control unit 13 stops control of the fusion splicing unit 3 and the fusion splicing unit 3 becomes inoperable (locked state) when the usable period has timed out. In this case, even if the user operates the splicing start switch 8, fusion of the optical fibers is not performed. Since such a function extremely limits the original function of the fusion splicing apparatus 10 after it is stolen or carried away, an effect of preventing the fusion splicing apparatus 10 from being stolen or carried away itself is expected. When the remaining period of use is zero or less, the remaining period of use calculation unit 15 outputs a signal for stopping the operation of the fusion splicing unit 3 to the basic control unit 13. Alternatively, the basic control unit 13 may stop the operation of the fusion splicing unit 3 when information on the remaining period of use is provided from the remaining period of use calculation unit 15 to the basic control unit 13 and the remaining period of use is zero or less. The remaining period of use may be set, for example, in units of days. The remaining period of use calculation unit 15 records the calculated remaining period of use in a non-volatile storage means (a ROM or the like). A determination as to whether or not the remaining period of use is zero or less is performed at least once each time the power switch 7 is operated and power supply to the fusion splicing apparatus 10 enters an ON state.

The remaining period of use estimation unit 16 acquires the number of times (the number of times of electric discharge) fusion splicing has been performed by the arc discharge. The number of times of electric discharge is counted by the remaining period of use estimation unit 16 on the basis of an input from the splicing start switch 8 by the user or a signal from the basic control unit 13. The remaining period of use estimation unit 16 further receives an output signal from the clock abnormality detection unit 14, and when the clock unit 11 is normal, records information on the number of times of electric discharge per unit period (for example, the number of times of electric discharge per unit period itself, or its moving average value) in a non-volatile storage means (a ROM or the like). The unit period may be, for example, N days (N is an integer of 1 or more) and typically one day. The moving average value is a moving average value over a recent plurality of unit periods and is a moving average value of the past M days (M is an integer of 2 or more) when the unit period is one day. The value of M may be, for example, 30. At the time of product shipment, an initial value of the number of times of electric discharge per unit period is recorded in advance.

When the clock abnormality detection unit 14 detects an abnormality in the clock unit 11, the remaining period of use calculation unit 15 cannot calculate the remaining period of use. Thus, the remaining period of use estimation unit 16 estimates the remaining period of use as follows. That is, when the clock abnormality detection unit 14 detects an abnormality in the clock unit 11, the remaining period of use estimation unit 16 refers to the information on the number of times of electric discharge per unit period recorded in the storage means while acquiring the number of times of electric discharge. Then, the remaining period of use estimation unit 16 calculates the remaining period of use assuming that the unit period has elapsed when the number of times of electric discharge has reached the recorded number of times of electric discharge per unit period (or its moving average value). When the remaining period of use is zero or less, the remaining period of use estimation unit 16 outputs a signal for stopping the operation of the fusion splicing unit 3 to the basic control unit 13. Alternatively, when the information on the remaining period of use is provided from the remaining period of use estimation unit 16 to the basic control unit 13 and the remaining period of use is zero or less, the basic control unit 13 may stop the operation of the fusion splicing unit 3. A determination as to whether or not the remaining period of use is zero or less is performed at least once each time the power switch 7 is operated and power supply to the fusion splicing apparatus 10 enters an ON state.

Figure 4:
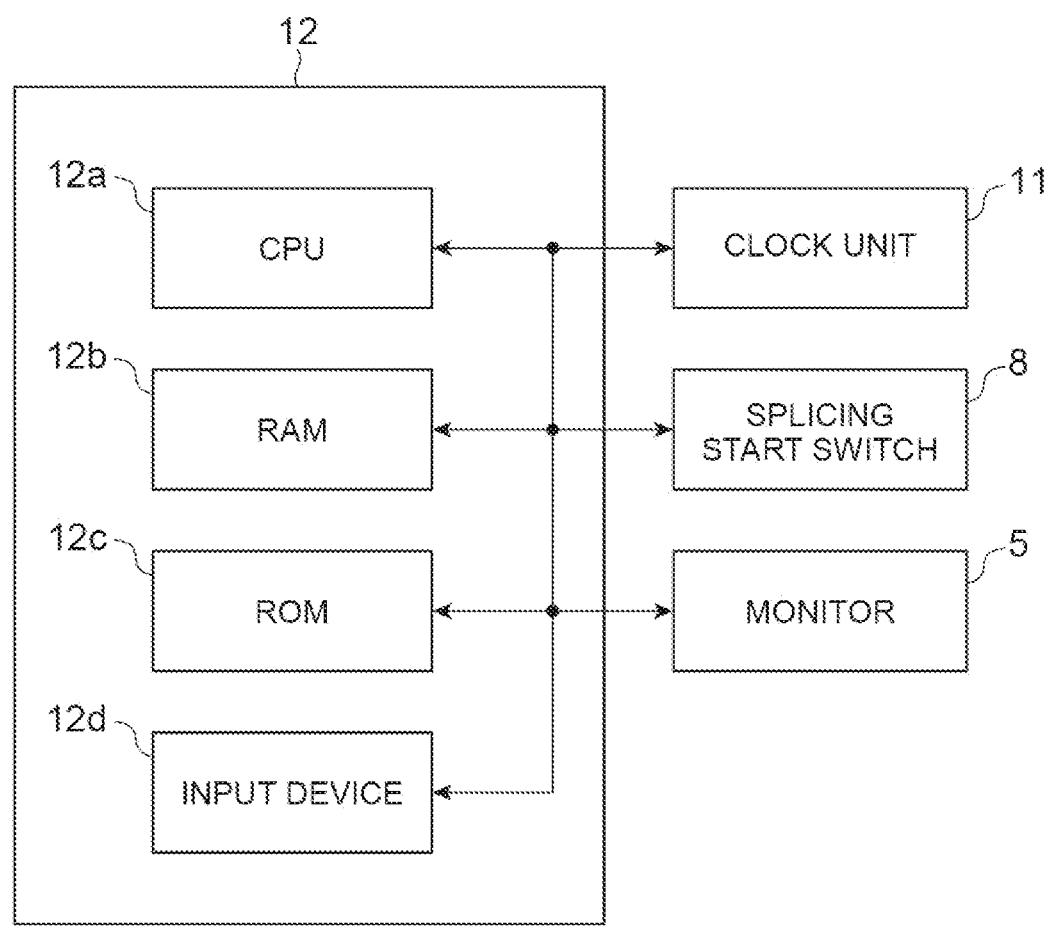
FIG. 4 is a block diagram illustrating an example of a hardware configuration of a fusion control unit.

FIG. 4 is a block diagram illustrating an example of a hardware configuration of the fusion control unit 12. As illustrated in FIG. 4, the fusion control unit 12 may be configured as a computer including a CPU 12a, a RAM 12b, and a ROM 12c. The fusion control unit 12 can realize each function of the fusion control unit 12 by performing reading and writing of data with respect to the RANI 12b and the ROM 12c under control of the CPU 12a while executing reading of a program stored in the ROM 12c in advance. An operating state of the fusion control unit 12 is always displayed on the monitor 5 during the operation of the fusion splicing apparatus 10. The fusion control unit 12 is electrically connected to the splicing start switch 8 and receives an electric signal from the splicing start switch 8. The fusion control unit 12 further includes an input device 12d for inputting the usable period from the outside. The input device 12d may be configured by, for example, a wired communication port such as USB (Universal Serial Bus) or a wireless communication circuit corresponding to a wireless standard such as IEEE 802.11.

Figure 5:
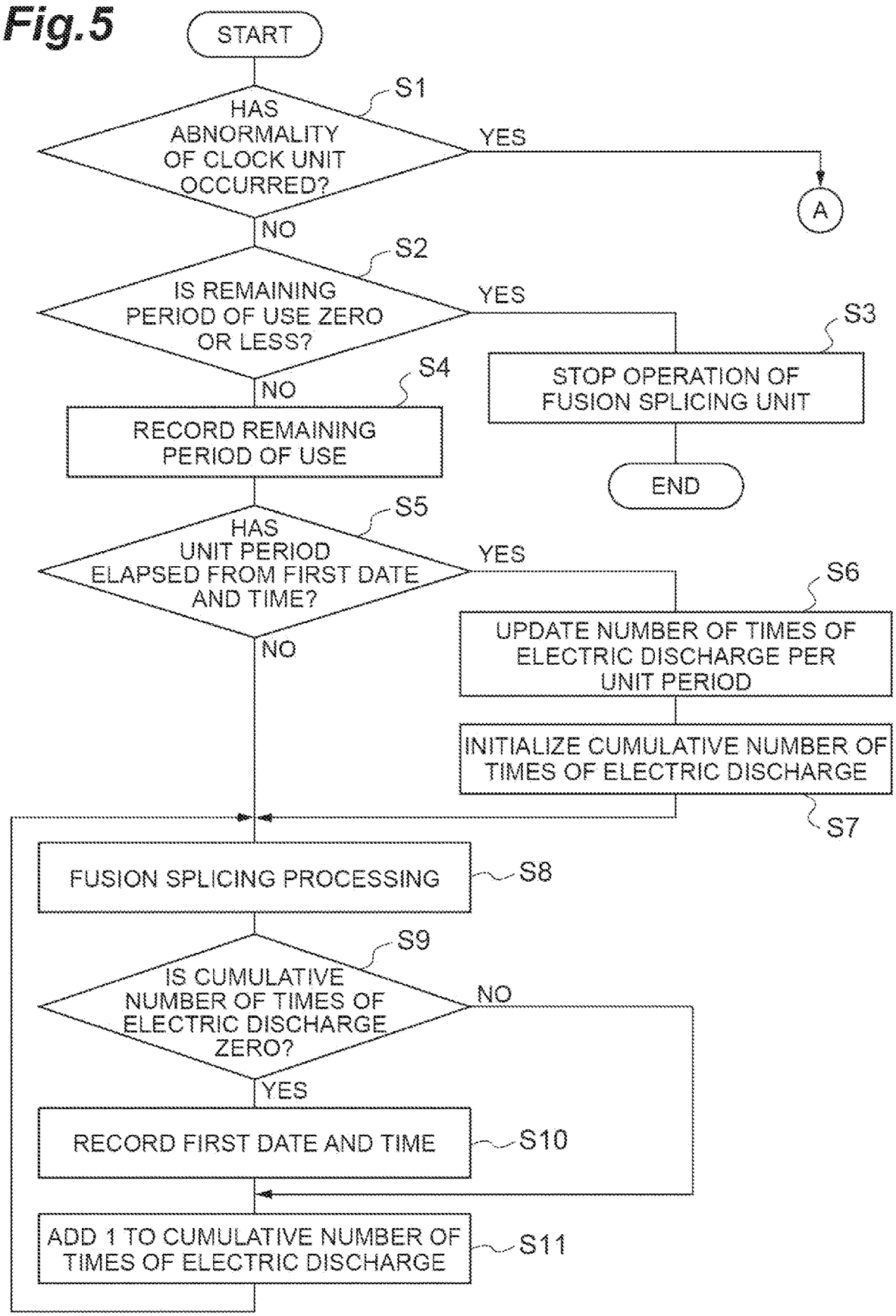
FIG. 5 is a flowchart illustrating an operation of the fusion control unit.
Figure 6:
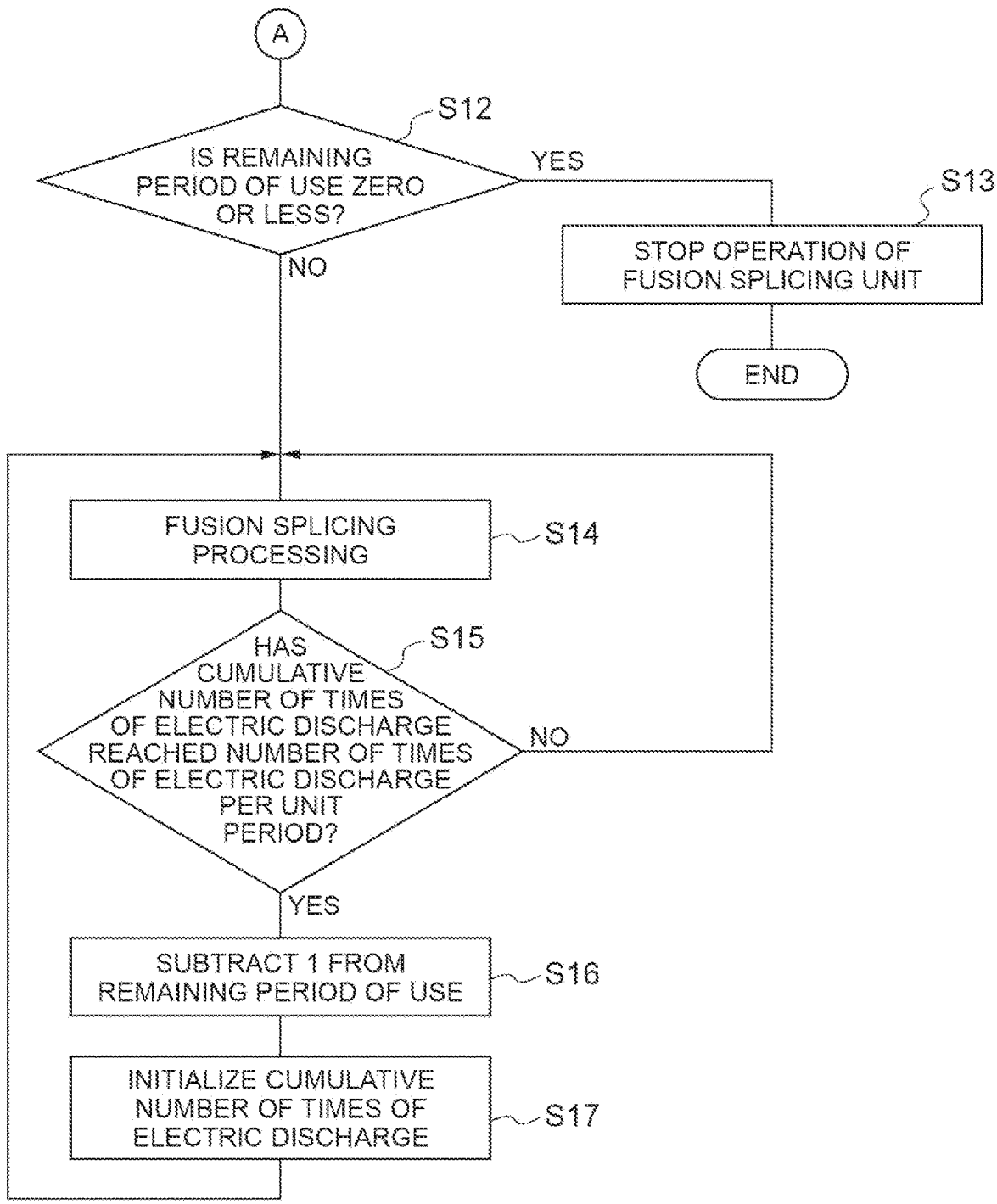
FIG. 6 is a flowchart illustrating the operation of the fusion control unit.

FIGS. 5 and 6 are flowcharts illustrating an operation of the fusion control unit 12. When the power switch 7 is operated and power supply to the fusion splicing apparatus 10 enters an ON state, first, the clock abnormality detection unit 14 of the fusion control unit 12 determines whether or not an abnormality has occurred in the clock unit 11 (Step S1). When the clock unit 11 is normal (step S1: NO), the remaining period of use calculation unit 15 reads a set usable period from the storage means such as the ROM and receives an input of a current date and time from the clock unit 11. Then, the remaining period of use calculation unit 15 calculates a remaining period of use from the usable period and the current date and time and determines whether or not the remaining period of use is zero or less (step S2). When the remaining period of use is zero or less (step S2: YES), the basic control unit 13 stops an operation of the fusion splicing unit 3 (step S3). When the remaining period of use is greater than 0 (step S2: NO), the basic control unit 13 allows the operation of the fusion splicing unit 3. Then, the remaining period of use is recorded in the storage means such as the ROM (step S4).

Next, the remaining period of use estimation unit 16 determines whether or not a unit period has elapsed from a first date and time (date and time when a first fusion processing has been performed after a previous unit period has elapsed) recorded in the storage means such as the ROM (step S5). When the unit period has elapsed from the first date and time (step S5: YES), the remaining period of use estimation unit 16 updates information on the number of times of electric discharge per unit period recorded in the storage means on the basis of the cumulative number of times of electric discharge within the unit period at that time (step S6). For example, when the information on the number of times of electric discharge per unit period is a moving average value, the remaining period of use estimation unit 16 counts the cumulative number of times of electric discharge as a latest number of times of electric discharge per unit period and updates the moving average value. Thereafter, the cumulative number of times of electric discharge is initialized (step S7). When the unit period has not elapsed from the first date and time (step S5: NO), the above-described steps S6 and S7 are not performed, and the processing proceeds to a next step.

When the user operates the splicing start switch 8 and fusion processing by an arc discharge is performed (step S8), the remaining period of use estimation unit 16 checks the cumulative number of times of electric discharge within the unit period (step S9). When the cumulative number of times of electric discharge within the unit period is zero (step S9: YES), the remaining period of use estimation unit 16 records a date and time at that time in the storage means such as the ROM as the first date and time (step S10). After step S9, or when the cumulative number of times of electric discharge within the unit period is one or more (step S9: NO), the remaining period of use estimation unit 16 adds 1 to the cumulative number of times of electric discharge in the unit period (step S11). Thereafter, the processing returns to step S8 again. Such steps S8 to S11 are repeatedly performed until the power switch 7 is operated and power supply to the fusion splicing apparatus 10 enters an OFF state.

On the other hand, when the clock unit 11 is abnormal in step S1 (step S1: YES), the remaining period of use is read from the storage means such as a ROM by the remaining period of use estimation unit 16, and it is determined whether or not the remaining period of use is zero or less (step S12). When the remaining period of use is zero or less (step S12: YES), the basic control unit 13 stops the operation of the fusion splicing unit 3 (step S13). When the remaining period of use is greater than zero (step S12: NO), the basic control unit 13 allows the operation of the fusion splicing unit 3.

When the user operates the splicing start switch 8 and fusion processing by the arc discharge is performed (step S14), the remaining period of use estimation unit 16 checks the cumulative number of times of electric discharge within the unit period (step S15). When the cumulative number of times of electric discharge within the unit period has reached the number of times of electric discharge per unit period (or its moving average value) recorded in the storage means such as the ROM (step S15: YES), the remaining period of use estimation unit 16 records a new remaining period of use obtained by subtracting 1 from the remaining period of use in the storage means such as the ROM (step S16) and initializes the cumulative number of times of electric discharge within the unit period (step S17). When the cumulative number of times of electric discharge within the unit period has not reached the number of times of electric discharge per unit period (or its moving average value) recorded in the storage means such as the ROM (step S15: NO), the above-described steps S16 and S17 are not performed. Thereafter, the processing returns to step S14 again. Such steps S14 to S17 are repeatedly performed until the power switch 7 is operated and power supply to the fusion splicing apparatus 10 enters an OFF state.

Effects that can be obtained by the fusion splicing apparatus 10 according to the present embodiment described above will be described. In the fusion splicing apparatus 10, when the remaining period of use known from the current date and time and the usable period is zero or less, the fusion control unit 12 stops the operation of the fusion splicing unit 3. Thereby, it is possible to realize a function of setting a usable period, for example, at the start of use (or at the start of lending) and disabling (locking) the fusion splicing when the usable period has elapsed. Further, the fusion control unit 12 records information on the number of times of electric discharge per unit period when the clock unit 11 is normal. Then, when an abnormality of the clock unit 11 is detected, the fusion control unit 12 determines the remaining period of use assuming that the unit period has elapsed when the number of times of electric discharge has reached the number of times of electric discharge per unit period. Thereby, the fusion splicing function can be locked after a period close to the usable period even when an abnormality occurs in the clock unit 11.

In the method of the present embodiment, although it is difficult to perform lock processing that accurately corresponds to the usable period, lock processing can be performed with an approximate period that is not so different from the usable period (for example, an error of several days when the unit period is one day). In order to prevent the fusion splicing apparatus from being stolen or carried away, sufficient effects can be obtained even with such a rough period setting. This is because no value can be found in stealing or carrying away the fusion splicing apparatus 10 if it is generally recognized that the fusion splicing apparatus 10 cannot be used in the near future even if it is illegally acquired. On the other hand, when the clock unit 11 becomes abnormal due to a mere failure, if the fusion splicing function is locked before the set usable period has elapsed, this may affect a construction period of the user. Therefore, a grace period (for example, a grace period of several days when the unit period is one day) may be provided between the time when the remaining period of use estimated from the number of times of electric discharge is zero or less and the time when the operation of the fusion splicing unit 3 is stopped.

As in the present embodiment, the unit period may be N days (N is an integer of 1 or more). When construction work including the fusion splicing of optical fibers is performed, the work is often carried out for a day cycle, such as working during daytime and resting at night (or vice versa). Thus, when the above-described unit period is set in units of days such as N days, the number of times of electric discharge per unit period is stable and the remaining period of use can be determined more accurately.

As in the present embodiment, the fusion control unit 12 may determine the clock unit 11 as abnormal when a signal on a date and time is not output from the clock unit 11. Alternatively, when a current date and time output from the clock unit 11 is earlier than the date and time stored in advance, the fusion control unit 12 may determine the clock unit 11 as abnormal. According to one or both of these, an abnormality in the clock unit 11 can be appropriately determined.

As in the present embodiment, when an abnormality in the clock unit 11 is detected, the fusion control unit 12 may determine the remaining period of use assuming that the unit period has elapsed when the number of times of electric discharge has reached the moving average value of the number of times of electric discharge per unit period that has been recorded when the clock unit 11 is normal. Thereby, even when the number of times of electric discharge per unit period changes for each unit period, the remaining period of use can be determined more accurately.

Although the fusion splicing apparatus according to the present embodiment has been described above, the fusion splicing apparatus according to the present invention is not limited to the above-described embodiment and various modifications can be applied thereto.

REFERENCE SIGNS LIST

2 Housing
3 Fusion splicing unit
3a Fiber positioning part
3b Discharging electrode
3c Optical fiber holder
4 Heater
5 Monitor
6 Windproof cover
7 Power switch
8 Splicing start switch
10 Fusion splicing apparatus
11 Clock unit
12 Fusion control unit
12a CPU
12b RAM
12c ROM
12d Input device
13 Basic control unit
14 Clock abnormality detection unit
15 Remaining period of use calculation unit
16 Remaining period of use estimation unit

The invention claimed is:

1. A fusion splicing apparatus comprising:
fusion splicing machinery configured to fusion splice optical fibers by electric discharges;
a clock configured to output a current date and time; and
a fusion controller configured to control an operation of the fusion splicing machinery and stop the operation of the fusion splicing machinery when a remaining period of use obtained on the basis of the current date and time output from the clock and a usable period input from the outside in advance is zero or less,
wherein the fusion controller records information on the number of times of electric discharge per unit period when the clock is normal and determines the remaining period of use assuming that the unit period has elapsed when the number of times of electric discharge has reached the number of times of electric discharge per unit period in a case in which an abnormality of the clock is detected, and
wherein the fusion controller determines the clock as abnormal when a signal on a date and time is not output from the clock.

2. The fusion splicing apparatus according to claim 1, wherein the unit period is N days (N is an integer of 1 or more).

3. The fusion splicing apparatus according to claim 1, wherein the fusion controller determines the remaining period of use assuming that the unit period has elapsed when the number of times of electric discharge has reached a moving average value of the number of times of electric discharge per unit period that has been recorded when the clock is normal in a case in which an abnormality of the clock is detected.

4. A fusion splicing apparatus comprising:
fusion splicing machinery configured to fusion splice optical fibers by electric discharges;
a clock configured to output a current date and time; and
a fusion controller configured to control an operation of the fusion splicing machinery and stop the operation of the fusion splicing machinery when a remaining period of use obtained on the basis of the current date and time output from the clock and a usable period input from the outside in advance is zero or less,
wherein the fusion controller records information on the number of times of electric discharge per unit period when the clock is normal and determines the remaining period of use assuming that the unit period has elapsed when the number of times of electric discharge has reached the number of times of electric discharge per unit period in a case in which an abnormality of the clock is detected, and
wherein the fusion controller determines the clock as abnormal when a date and time output from the clock is earlier than a date and time stored in advance.

5. The fusion splicing apparatus according to claim 4, wherein the unit period is N days (N is an integer of 1 or more).

6. The fusion splicing apparatus according to claim 4, wherein the fusion controller determines the remaining period of use assuming that the unit period has elapsed when the number of times of electric discharge has reached a moving average value of the number of times of electric discharge per unit period that has been recorded when the clock is normal in a case in which an abnormality of the clock is detected.

* * * * *